No. 842,616. PATENTED JAN. 29, 1907.
J. Y. BRADBURY.
BATTERY JAR OR CELL.
APPLICATION FILED OCT. 25, 1906.

Witnesses.  Inventor.
C. H. Garnett  Joseph Y. Bradbury
J. Murphy  by Jas. H. Churchill
  atty.

UNITED STATES PATENT OFFICE.

JOSEPH Y. BRADBURY, OF SOMERVILLE, MASSACHUSETTS.

BATTERY JAR OR CELL.

No. 842,616.　　　　　Specification of Letters Patent.　　　　Patented Jan. 29, 1907.

Application filed October 25, 1906. Serial No. 340,430.

*To all whom it may concern:*

Be it known that I, JOSEPH Y. BRADBURY, a citizen of the United States, residing in Somerville, in the county of Middlesex and State of Massachusetts, have invented an Improvement in Battery Jars or Cells, of which the following description, in connection with the accompanying drawings, is a specification, like letters on the drawings representing like parts.

This invention relates to a battery cell or jar, and especially to a jar or cell for use in portable batteries, and particularly in portable storage batteries, such as now commonly employed on motor-vehicles.

The present invention has for its object to provide a battery jar or cell which can be handled roughly and even dropped without rendering the same unfit for use and a plurality of which can be placed in a stationary box or case so as to make contact therewith and with one another without danger of leakage of current from one jar to another and from the jars to the retaining box or case, thereby avoiding short circuits and materially prolonging the life, capacity, and usefulness of the battery. For this purpose a battery jar or cell of hard rubber or other fragile non-metallic substantially acid-resisting material, such as now commonly used, is provided with an exterior arm or of flexible fibrous material, such as cloth, which is rendered impervious to liquids and acid and alkali resisting, and which armor is made so as to cover the bottom and the greater portion of the sides and ends of the jar or cell proper and leave the upper portion of said jar or cell uncovered, so that when a plurality of the armored jars or cells are placed in a retaining box or receptacle an air space or gap will be formed between the upper ends of contiguous jars and between the upper ends of the jars and the retaining box or receptacle, thereby preventing leakage of current from one jar to another and from the jars to the retaining box or receptacle, due to moisture, while at the same time obtaining the full benefits of the armor.

The particular features of this invention will be pointed out in the claims at the end of this specification.

Figure 1:
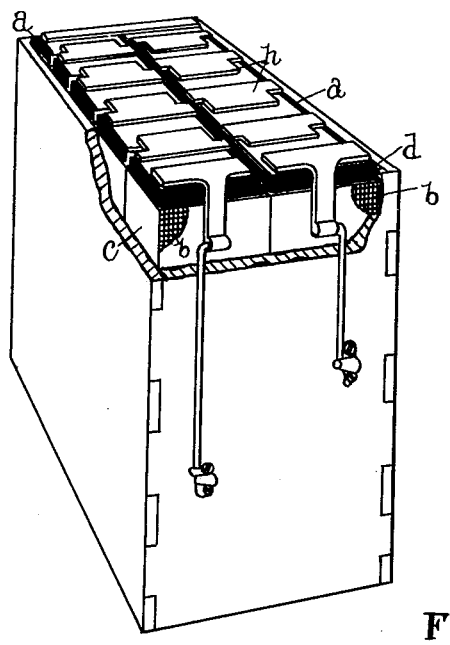
Figures 2, 3:
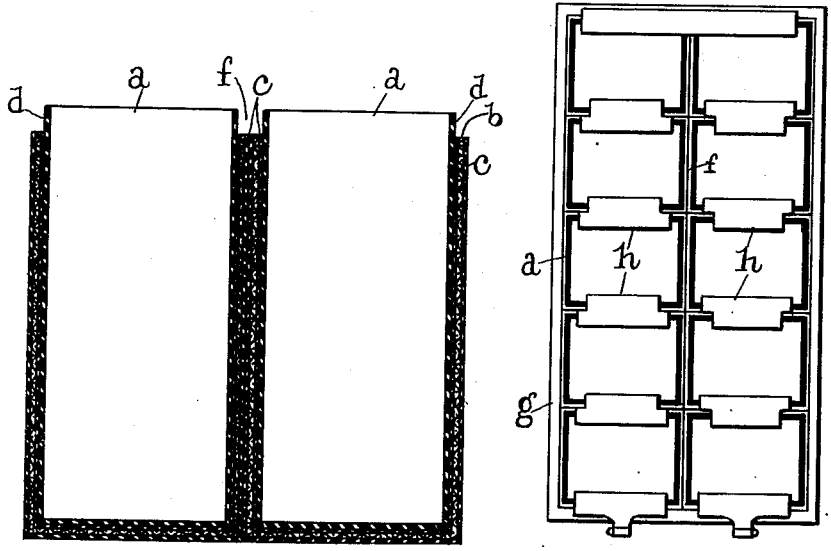

Figure 1 represents a plurality of battery jars or cells embodying this invention and located in a retaining box or receptacle; Fig. 2, a plan of the batteries shown in Fig. 1; and Fig. 3, a vertical cross-section, on an enlarged scale, of two armored jars placed side by side.

Referring to the drawings, $a$ represents a battery cell or jar, of hard rubber or like fragile non-metallic material, such as now commonly employed. The jar or cell $a$ is provided with an external armor $b$, of flexible fibrous material, such as cloth, which fits over the bottom, sides, and ends of the cell or jar $a$ and is rendered impervious and acid and alkali resisting, or substantially so, by means of a suitable medium—such as asphaltum, shellac, pitchy composition, rubber solutions, &c.—which medium impregnates the cloth and is represented by $c$ in the drawings.

The jacket or armor referred to serves to maintain the battery jar or cell in serviceable condition and retains the battery solution, even though the cell or jar $a$ should become cracked or broken. The external armor also serves to prevent short-circuiting of the battery, and for this purpose said armor is made smaller than the jar or cell $a$, so that when applied thereto the outer surface of the jar or cell for a short distance below the upper edge of said jar, as at $d$, is left uncovered. (See Figs. 1 and 3.) By means of this construction an air space or gap $f$ is formed between the upper edges of contiguous jars or cells when the latter are fitted close together in a retaining box or case $g$, and a similar space is formed between the jar or cell and the inner wall of said box or case. In this manner short-circuiting of the battery is avoided, or at least reduced to a minimum, and the life, capacity, and usefulness of the battery materially prolonged.

In the present instance a series of ten battery jars or cells embodying this invention are represented as arranged in the retaining case or box $g$ and the electrodes of one battery are connected to the electrodes of adjacent batteries in the usual manner by connecting-pieces or terminal straps $h$.

The invention is particularly well adapted for use with jars or cells of fragile material; but I do not desire to limit my invention in this respect, as it can be used to advantage with jars of non-fragile material and prevent short-circuiting, while permitting such jars to be made very thin and light.

I claim—

1. A battery jar or cell of the class described, comprising a jar or cell of fragile, non-metallic material, and a jacket or armor of flexible, fibrous material applied to the exterior surface of the said jar or cell to cover the bottom and greater portion of the sides and ends of the same and to leave a portion of the outer surfaces of said sides and ends uncovered at the top of the same, and a substantially acid-resisting medium applied to said fibrous armor to render the same impervious, for the purpose specified.

2. A battery jar or cell of the class described, comprising a jar or cell, and a jacket or armor of flexible, fibrous material applied to the exterior surface of the said jar or cell to cover the bottom and greater portion of the sides and ends of the same and to leave a portion of the outer surfaces of said sides and ends uncovered at the top of the same, and a substantially acid-resisting medium applied to said fibrous armor to render the same impervious, for the purpose specified.

In testimony whereof I have signed my name to this specification in the presence of two subscribing witnesses.

JOSEPH Y. BRADBURY.

Witnesses:
JAS. H. CHURCHILL,
J. MURPHY.